(12) United States Patent
Fujiwara et al.

(10) Patent No.: US 6,318,427 B1
(45) Date of Patent: Nov. 20, 2001

(54) TIRE SYSTEM FOR MOTORCYCLES INCLUDING ANNULAR TIRE CORE WITH RADIALLY INNER GROOVE

(75) Inventors: Kenichi Fujiwara, Miki; Takao Kuwahara, Kobe, both of (JP)

(73) Assignee: Sumitomo Rubber Industries, Ltd., Kyogo-ken (JP)

( * ) Notice: Subject to any disclaimer, the term of this patent is extended or adjusted under 35 U.S.C. 154(b) by 0 days.

(21) Appl. No.: 09/257,948

(22) Filed: Feb. 26, 1999

(30) Foreign Application Priority Data

Mar. 4, 1998 (JP) .................................................. 10-052409

(51) Int. Cl.[7] .............................. B60C 5/02; B60C 17/06; B60C 19/12
(52) U.S. Cl. ............................ 152/157; 152/166; 152/196
(58) Field of Search ..................................... 152/157, 165, 152/166, 196, 158, 520

(56) References Cited

FOREIGN PATENT DOCUMENTS 3231008   10/1991   (JP) .

Primary Examiner—Adrienne C. Johnstone
(74) Attorney, Agent, or Firm—Birch, Stewart, Kolasch & Birch, LLP

(57) ABSTRACT

A tire system for motorcycles comprises a pneumatic tire having a cavity, an annular tire core made of an elastic closed-cell material disposed in the cavity and provided on the radially inside with a groove, and a pressure bag inserted in the groove, wherein: in a free state of the tire core not disposed in the cavity, the cross sectional area Sa of the tire core is in the range of from 3.1 to 4.8 times the cross sectional area Sb of the groove; and the total Sa+Sb of the cross sectional area Sa of the tire core and the cross sectional area Sb of the groove is in the range of from 1.0 to 1.3 times the cross sectional area Sc of the cavity.

6 Claims, 3 Drawing Sheets

TIRE SYSTEM FOR MOTORCYCLES INCLUDING ANNULAR TIRE CORE WITH RADIALLY INNER GROOVE

BACKGROUND OF THE INVENTION

1. Field of the Invention

The present invention relates to a tire system for motorcycles comprising a pneumatic tire, a tire core disposed therein and a pressure bag disposed in the core.

2. Description of the Related Art

In motorcycles arranged for running off-road, a pneumatic tire is usually used together with a tire tube because the tire inflation pressure is relatively low. In this case, therefore, the tire tube is liable to puncture when getting over edged objects such as rocks, stumps and the like and landing after a high jump for example.

In order to prevent such punctures of tire tube, the laid-open Japanese patent application No. JP-A-3-231008 has proposed to use a buffer made of sponge rubber disposed between the tire and tube. The buffer is effective for preventing the punctures. However, the durability of the buffer is liable to be decreased by heat generation during running due to friction between the tire and buffer. If the buffer is increased in the volume to reduce the friction, it becomes difficult to mount the tire on the rim.

SUMMARY OF THE INVENTION

It is therefore, an object of the present invention to provide a tire system, in which the durability can be improved without increasing the difficulty in the assembling work.

According to the present invention, a tire system comprises a pneumatic tire having a cavity, an annular tire core made of an elastic closed-cell material disposed in the cavity and provided on the radially inside with a groove, a pressure bag inserted in the groove, wherein in a free state of the tire core not disposed in the cavity, the cross sectional are Sa of the tire core is in the range of from 3.1 to 4.8 times the cross sectional are Sb of the groove, and the total Sa+Sb of the cross sectional area Sa of the tire core and the cross sectional area Sb of the groove is in the range of from 1.0 to 1.3 times the cross sectional are Sc of the cavity.

BRIEF DESCRIPTION OF THE DRAWINGS

An embodiment of the present invention will now be described in detail in conjunction with the accompanying drawings.

DETAILED DESCRIPTION OF THE INVENTION

Figure 1:
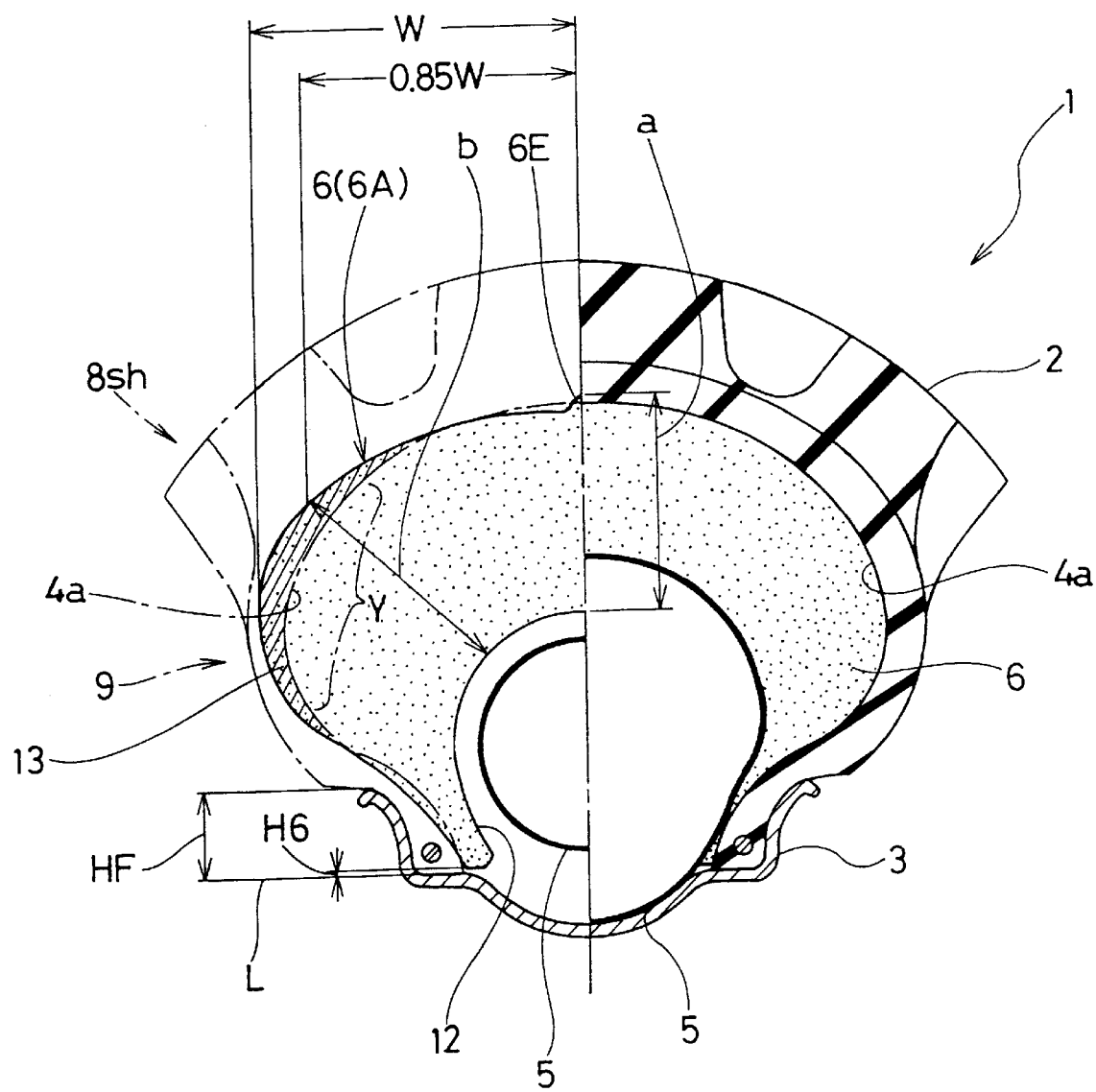
FIG. 1 is a perspective view of an assembly of a pneumatic tire, tire core, pressure bag and wheel rim showing an embodiment of the present invention.

According to the present invention, a tire system comprises a pneumatic tire 2, an annular tire core 6 inserted in the cavity of the tire, and a annular pressure bag disposed in a groove which is formed on the radially inside of the tire core 6. The tire 2, core 6 and pressure bag 5 are assembled beforehand. Then, the assembly is mounted on a wheel rim 3. In this system, the inside 4a of the tire 2 is pressurized by the tire core 6. The pressure bag 5 supports the inside of the tire core 6 by its inflation.

The tire 2 comprises a tread portion 8, a pair of sidewall portions 9, and a pair of bead portions 10. Usually, the tire 2 is reinforced by a bead core disposed in each bead portion, and at least one carcass ply extending between the bead portions through the tread portion and sidewall portions, and a belt disposed radially outside the carcass in the tread portion. In comparison with tires in other fields such as passenger car tires, truck/bus tires and the like, the tread portion 8 is curved at a relatively small radius so that the maximum tire width lies between the tread edges. In this embodiment, the tread portion 8 is provided with a plurality of blocks 8a to form a block pattern.

The wheel rim 3 comprises a pair of rim seats 3b on which the tire bead portions 10 sit, a round well 3a therebetween, and a pair of rim flanges 3c each extending radially outwardly from the axially outer end of one of the rim seats 3b.

In this embodiment, as shown in FIG. 1, the flanges 3a and rim seats 3b are each provided with a large number of small height projections 11 each extending in a direction at a right angle to the tire circumferential direction. Therefor, the projections 11 effectively increase circumferential friction between the tire 2 and rim 3 under relatively low pressure conditions in particular. Further, during mounting the tire on the wheel rim, air between the bead portion 10 and rim flange 3c is released through the space formed around the projections 11, and air retention after the tire is mounted on the wheel rim can be prevented.

Figure 2:
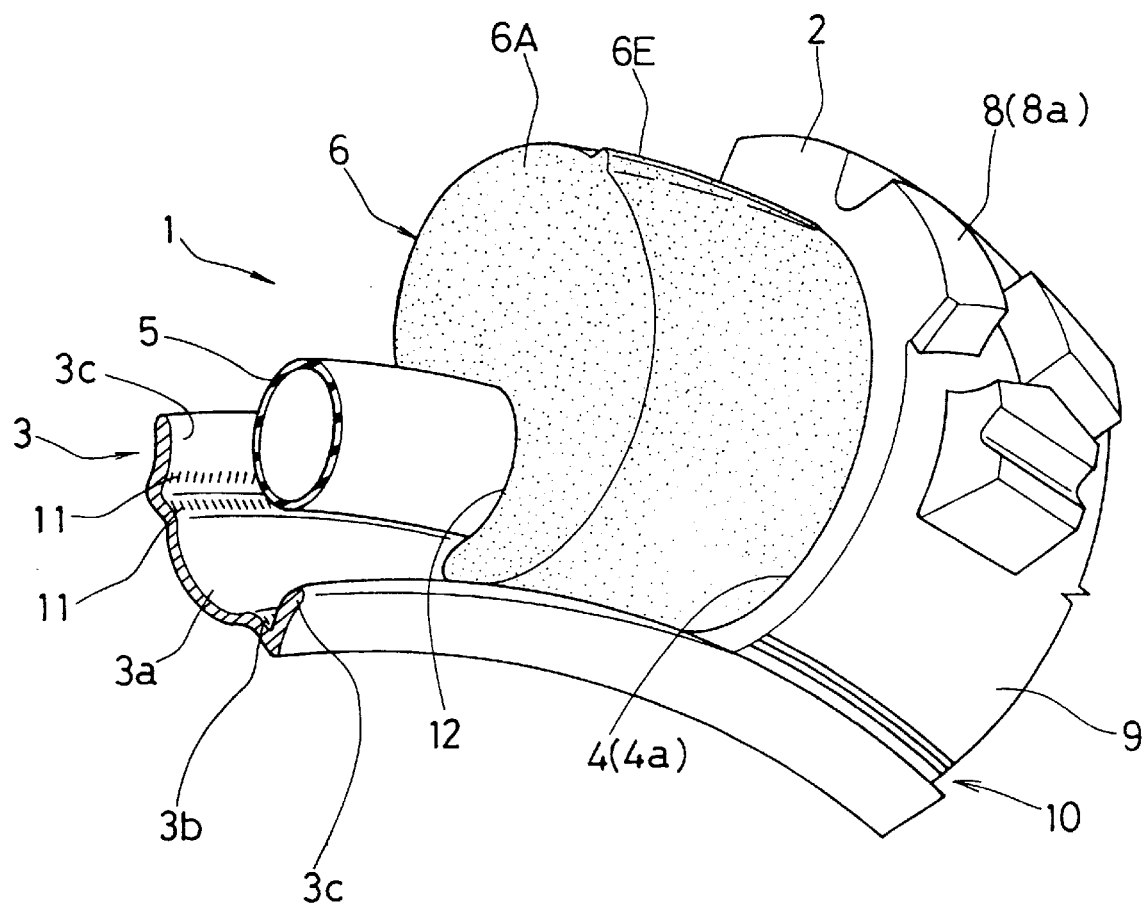
FIG. 2 is a cross sectional view of which right half shows the assembly in which the pressure bag is normally inflated, and left half shows the tire core under the free state and the pressure bag being inflated to 10% of the working pressure.

The pressure bag 5 is an annular endless tube made of an air-impermeable rubber compound including butyl-rubber as a major component. Preferably, under 10% of a working pressure, the pressure bag 6 has a substantially circular sectional shape as shown in FIG. 1 and FIG. 2, and the center thereof is located at a position lower than 50% of the tire section height so that the tire core 6 is pressed onto the inside 4a of the tire when inflated to the working pressure. Here, the working pressure for the pressure bag 5 is for example in the range of from 70 to 150 kpa, usually in the range of from 80 to 120 kpa. The rubber thickness of the pressure bag 5 is preferably in the range of from 0.03 to 0.1 times the pressure bag diameter under 10% of the working pressure. If less than 0.03 times the pressure bag diameter, the pressure bag is difficult to obtain a necessary strength. If more than 0.1 times the diameter, it becomes difficult to apply a necessary pressure to the inside of the tire, and the tire weight unfavorably increases.

The tire core 6 is an annular body of an elastic closed-cell material which has a JIS-C hardness of from 10 to 35 degrees, preferably 10 to 30 degrees, and a specific gravity of from 0.1 to 0.2. By specifically limiting the JIS-C hardness, namely a hardness of surface, the cornering grip and handling performance can be improved. In this example, a sponge rubber having an expansion rate of from 400 to 1500%, preferably 400 to 1100% is used. For the rubber material therefor, preferably, butyl rubber compounds such as butyl rubber, brominated butyl rubber, halogenated butyl rubber and the like are used. If the expansion rate is less than 400%, the shock absorption by the tire core 5 becomes insufficient and the pressure bag is liable to be punctured. Further, ride comfort is not good. If the expansion rate is more than 1500%, the load support by the tire core 5 becomes impossible and stability during straight running and cornering is lost.

The outer profile of the tire core 6 is deliberately altered from the inner profile of the tire 2.

The inner profile 4a of the tire is generally oval of which major axis extends in the axial direction.

Also, the outer profile of the tire core 6 is generally oval of which major axis extends in the axial direction, but both sides thereof are swelled as indicated in the left half of FIG. 2 as a hatched crescent area 13. The maximum thickness of this swelled portion 13 or the maximum difference between the two profiles occurs near but somewhat radially outside the maximum section width point of the tire core. The difference or thickness gradually decreases towards the radially inside and outside, and the radially outer end reaches to the mid point of a half sectional width W between the tire equatorial plane and the axially outmost point. The radially inner end reaches to about one third of the section height of the tire core.

The tire core 6 extends radially inwardly near to the bead bottom, and the radial height H6 of the radially inner end is not more than 25% of the height Hf of the rim flange, each measured from the bead base line L.

The radially inside of the tire core 6 is provided with a groove 12 for inserting the pressure bag 5 therein.

The groove 12 extends continuously in the circumferential direction, and the sectional shape thereof is an arc of more than 180 degrees preferably more than 210 degrees but less than 300 degrees (in this example, about 270 degrees).

The thickness (b) of the tire core 6 measured at a point on the outside of the tire core 6 at an axial distance of 0.85 times the half tire width W from the tire equatorial plane C is in the range of from 1.02 to 1.10 times the thickness (a) measured at the tire equator C.

Figure 3:
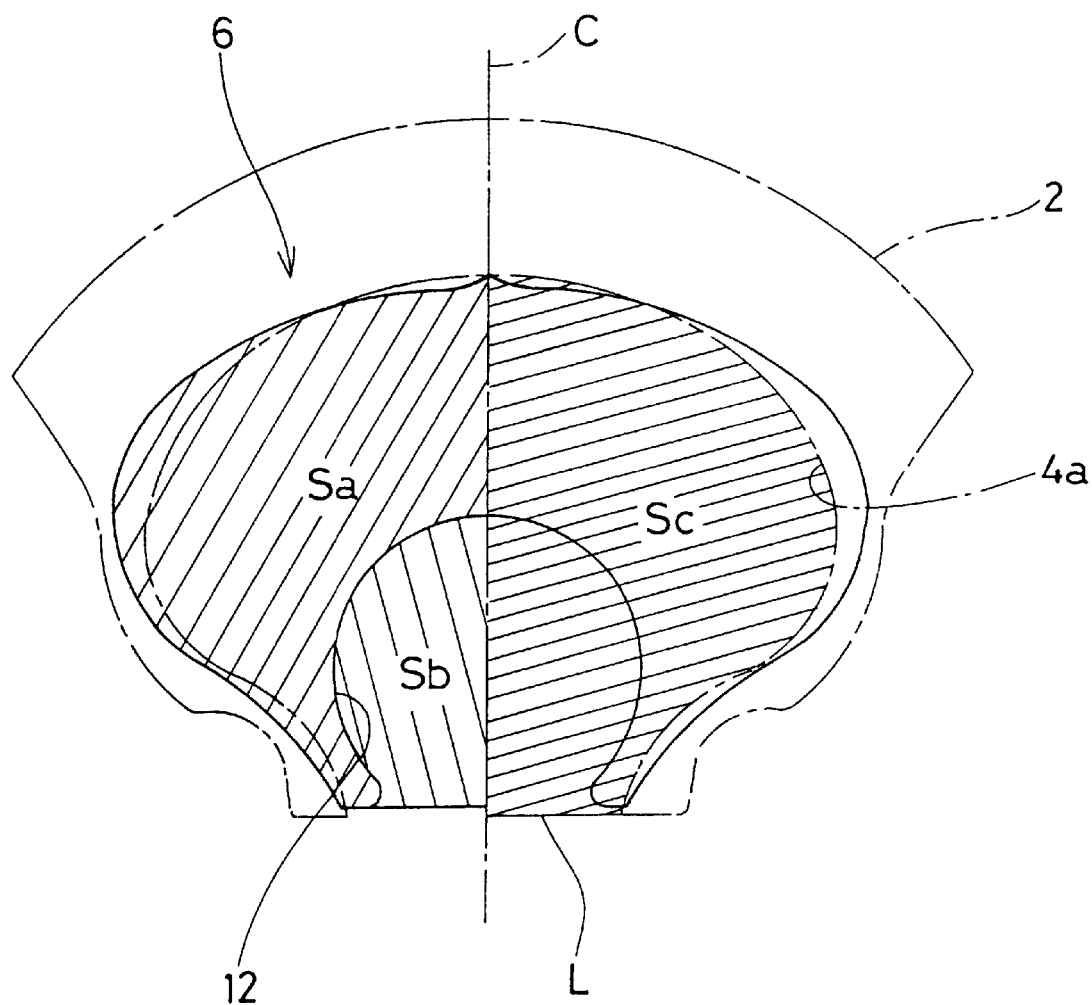
FIG. 3 is a diagram for explaining sectional areas of the tire cavity, tire core and groove.

Further, as shown in FIG. 3, under a free state not inserted in the tire cavity, the sectional area Sa of the tire core 6 is set in the range of from 3.1 to 4.8 times the sectional area Sb of the groove 12.

Furthermore, the total Sa+Sb of these sectional area Sa and Sb is in the range of from 1.0 to 1.3 times the sectional area Sc of the tire cavity. Here, the sectional area Sc is defined as of the tire cavity being surround by the tire inside 4a and the bead base line L when the tire 2 is mounted on the rim 3 without the core 6 and inflated to a standard pressure specified by Standardization Organization such as JATMA (Japan), TRA (USA), ETRTO (Europe) and the like.

Still furthermore, the sectional area Sa of the tire core 6 is preferably set in the range of from 0.76 to 1.1 times the sectional area Sc of the tire cavity.

Therefore, under service conditions, the tire core 6 is more compressed in the swelled portions 13 than the other portions. As a result, a part Y inside the tire sidewall 9 and shoulder 8sh is increased in the rigidity. Accordingly, it is possible to effectively support the tire load even if the bag 5 is punctured, and the cornering performance and running stability can be improved. Further, in the tread center portion, as the compression is relatively low, the ride comfort, shock absorption and road grip can be effectively improved. Further, during mounting the tire on the rim, as the tire core is less compressed in the radial direction than the axial direction, the tire core is prevented from being forced out from between the bead portions. As a result, the assembling work and mounting work are improved.

If Sa is less than 3.1 times Sb and/or Sa+Sb is less than 1.0 times Sc, the shock absorption, prevention of pressure bag's puncture and run-flat performance become poor. If Sa is more than 4.8 times Sb and/or Sa+Sb is more than 1.3 times Sc, the assembling becomes difficult, and further, the heat generation from the tire core 6 increases.

In this embodiment, the tire core 6 is further provided on the radially outside thereof with a peaked jut 6E. The jut 6E extends along the tire equator, and the height thereof is about 1 to 3 mm. Therefore, when the pressure bag 5 is inflated to the working pressure, the contact pressure between the jut 6E and the inside 4a of the tire becomes relatively high, and the tire core 6 can be prevented from being out of position, and relative movements can be effectively suppressed to lessen heat generation.

Comparison Tests

The following comparison tests were made using various tire cores. The specifications and the test results are shown in Table 1.

Assembling Work Test

Using a tire lever, a tire in which a tire core and pressure bag were set beforehand was mounted on a wheel rim five times by hand. When the pressure bag was broken or the tire could not be mounted on the rim one or more times, that was judged to be "bad".

Durability Test

An off-road motorcycle (two-cycle 250 cc engine) in which test tire system was applied to the rear wheel was continuously run on an off-road test course at an average speed of 30 km/h, and the running time until any failure occurred on the tire core was measured. (standard=three hours)

Inner pressure: 80 kpa

Front tire: 80/100-21

From the test results, it was confirmed that the tire systems according to the present invention can be improved in the durability while maintaining easy or safety assembling work

TABLE 1

|  | Ref. 1 | Ref. 2 | Ex. 1 | Ex. 2 | Ex. 3 | Ex. 4 |
|---|---|---|---|---|---|---|
| Tire size | | | 110/90-19 | | | |
| Tire cavity | | | | | | |
| Sectional area Sc (sq.cm) | 51.6 | 51.6 | 51.6 | 51.6 | 54.8 | 54.8 |
| Wheel rim width (in) | 2.15 | 2.15 | 2.15 | 2.15 | 2.5 | 2.5 |
| Tire Core | | | | | | |
| Material | | | Cellular butyl rubber | | | |
| Expansion rate | | | 800% | | | |
| Specific gravity | | | 0.16 | | | |
| Sectional area Sa (cm$^2$) | 35.5 | 57.9 | 40.5 | 49.8 | 49.8 | 57.9 |
| Sectional area Sb (cm$^2$) | 12.4 | 12.4 | 12.4 | 12.4 | 12.4 | 12.4 |
| Sa/Sb | 2.86 | 4.67 | 3.26 | 4.00 | 4.00 | 4.67 |
| (Sa + Sb)/Sc | 0.93 | 1.36 | 1.03 | 1.21 | 1.14 | 1.28 |
| Sa/Sc | 0.69 | 1.12 | 0.79 | 0.97 | 0.91 | 1.06 |
| Test results | | | | | | |
| Durability (hr.) | 1 | — | 3 | 8 | 5 | 8 |
| Rim mounting Work | good | bad* | good | good | good | good |

*Every time, the tire could not be mounted on the rim and the pressure bag was broken.

What is claimed is:

1. A tire system for motorcycles comprising a pneumatic tire having a cavity, an annular tire core made of an elastic closed-cell material disposed in the cavity and provided on the radially inside with a groove, a pressure bag inserted in the groove, wherein in a free state of the tire core not disposed in the cavity, the cross sectional area Sa of the tire core is in the range of from 3.1 to 4.8 times the cross sectional area Sb of the groove, and the total Sa+Sb of the cross sectional area Sa of the tire core and the cross sectional area Sb of the groove is in the range of from 1.0 to 1.3 times the cross sectional area Sc of the cavity.

2. The tire system according to claim 1, wherein the cross sectional area Sa of the tire core is in the range of from 0.76 to 1.1 times the cross sectional area Sc of the cavity.

3. The tire system according to claim 1, wherein the cross sectional shape of the groove is an arc of more than 180 degrees but less than 300 degrees.

4. The tire system according to claim 1, wherein the outer profile of the tire core is altered from the inner profile of the tire such that the tire core is more compressed in tire sidewall portions than a tread center portion when the pressure bag is inflated.

5. The tire system according to claim 1, wherein the tire core is provided on the radially outside thereof with a peaked jut having a radial height of from 1 to 3 mm, and extending along the tire equator.

6. The tire system according to claim 1, wherein the tire further comprises a pair of bead portions, and the tire core extends radially inwardly near to the bottom of the bead portions.

* * * * *